United States Patent [19]

Ciuffetti

[11] 4,158,374

[45] Jun. 19, 1979

[54] MEASURING DISPENSER

[75] Inventor: Salvatore D. Ciuffetti, Fitchburg, Mass.

[73] Assignee: Product Development Associates, Pocasset, Mass.

[21] Appl. No.: 869,952

[22] Filed: Jan. 16, 1978

[51] Int. Cl.² ............................................. G01F 11/10
[52] U.S. Cl. ..................................... 141/392; 222/42; 222/48; 222/363; 222/288
[58] Field of Search ...................... 222/42, 44, 47, 48, 222/184, 194, 264, 266, 268, 273, 274, 278, 284, 288, 305, 363, 368, 427–429; 141/392

[56] References Cited

U.S. PATENT DOCUMENTS

| | | | |
|---|---|---|---|
| 2,475,381 | 7/1949 | Erickson | 222/273 X |
| 2,793,940 | 5/1957 | Bennett | 222/363 X |
| 3,261,503 | 7/1966 | Cassidy | 222/42 |
| 3,606,965 | 9/1971 | Cortelyou et al. | 222/368 X |
| 3,754,686 | 8/1973 | Karlen | 222/363 X |

Primary Examiner—David A. Scherbel
Assistant Examiner—Fred A. Silverberg
Attorney, Agent, or Firm—Kenway & Jenney

[57] ABSTRACT

A measuring dispenser for flowable material comprises a hopper and a rotatable barrel member for transferring measured quantities of the material from the hopper to a receptacle. The barrel member has a plurality of angularly spaced recesses of predetermined volumetric capacities. By rotation of the barrel member in one direction through a selected angle, selected recesses are filled from the hopper in sequence, the material being retained in the filled recesses during such rotation. By subsequent rotation of the barrel member in the opposite direction through the same selected angle and an additional predetermined angle, the filled recesses are sequentially emptied into the receptacle.

9 Claims, 4 Drawing Figures

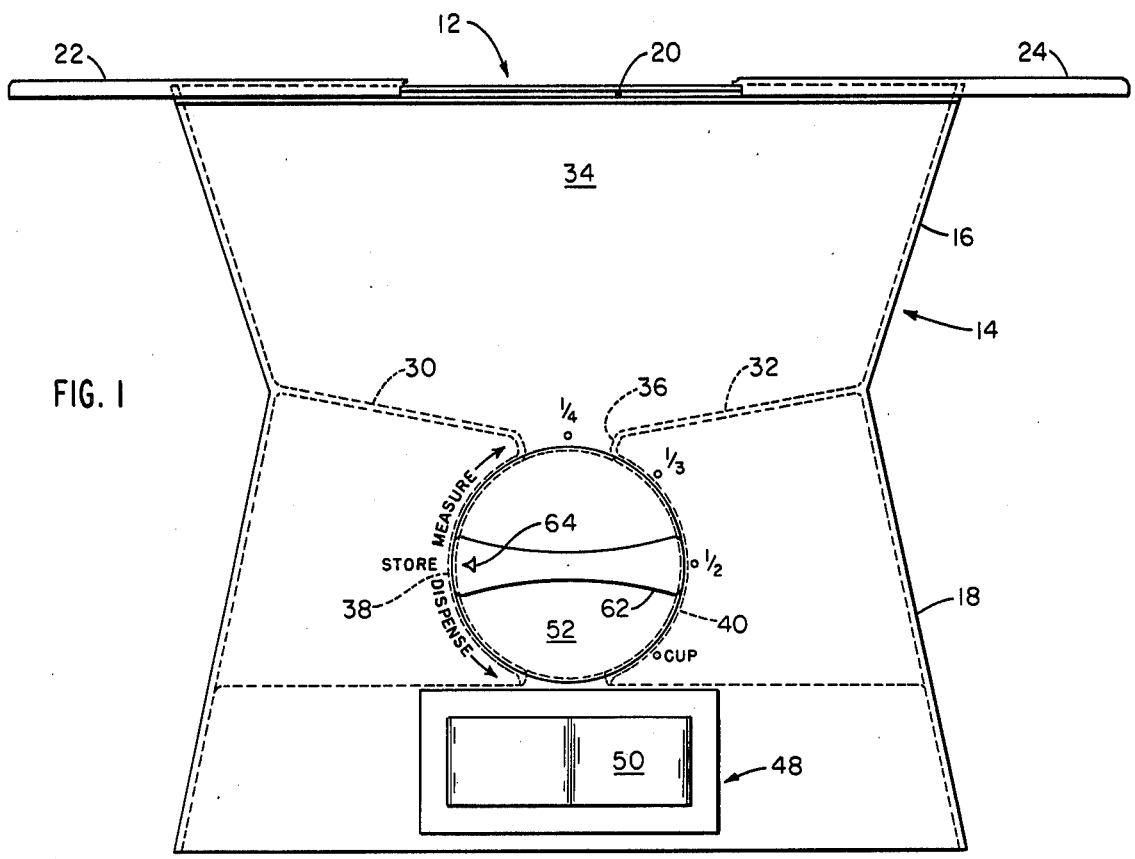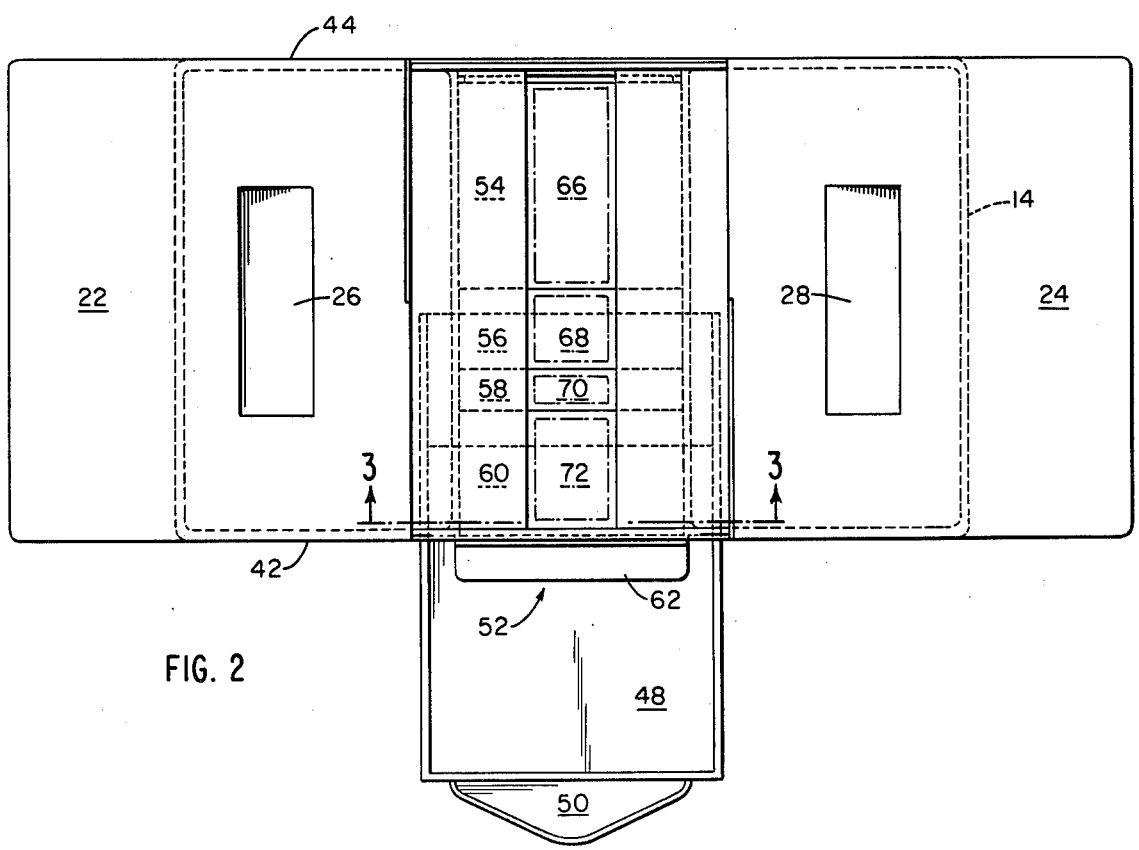

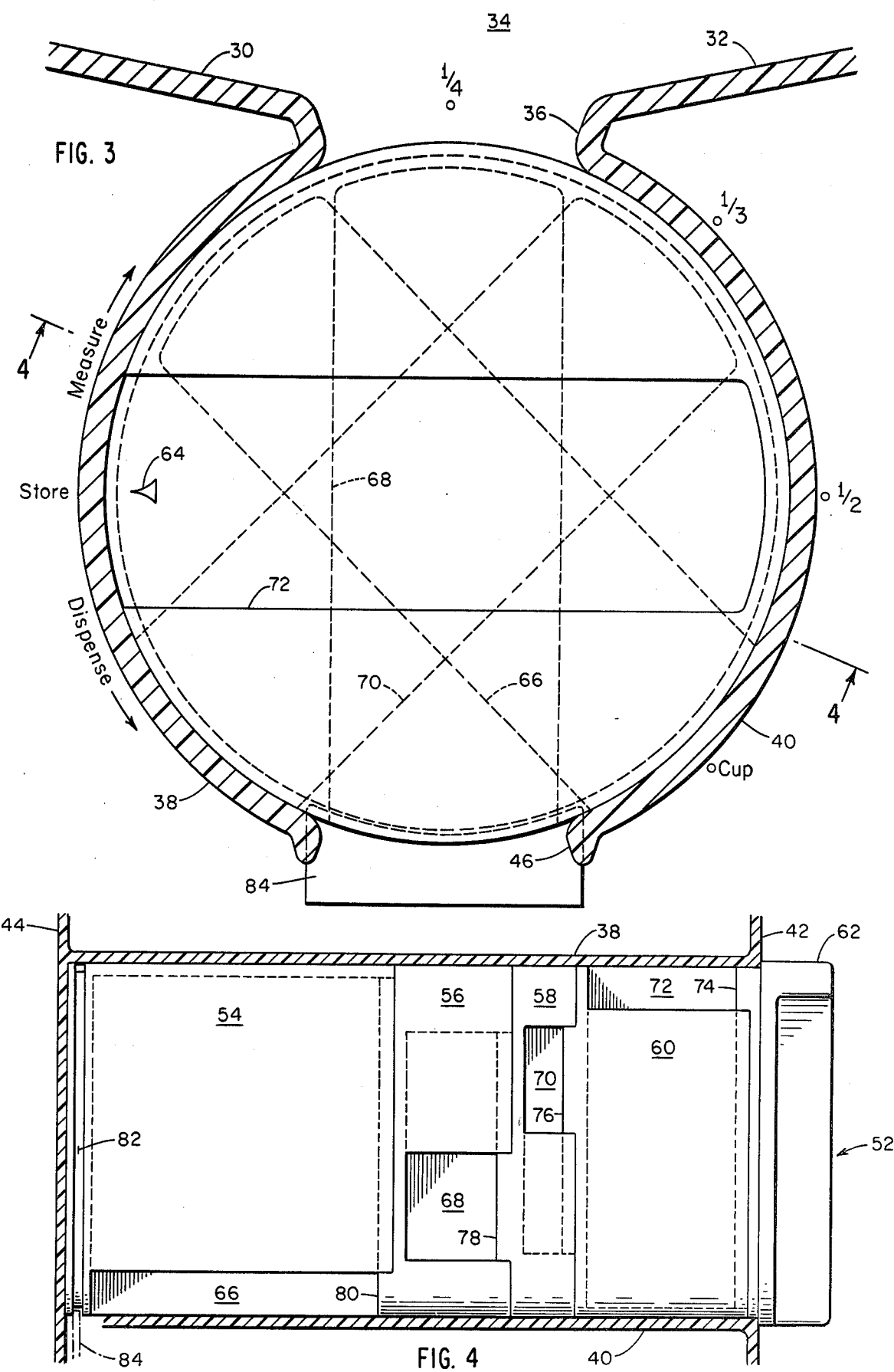

MEASURING DISPENSER

BACKGROUND OF THE INVENTION

This invention relates generally to measuring dispensers for flowable materials, and more particularly to such dispensers for household use in dispensing materials in pulverulent, granular or flaked form. A principal object is to provide a dispenser of simple, easily cleanable construction that is adapted to dispense any one of several discrete volumetric quantities of the material. For example, these quantities may be one-fourth, one-third, one-half and one full cup.

Another object is to provide a dispenser that may be operated by a single hand with a minimum number of separate movements.

Measuring dispensers previously in use have imperfectly satisfied the foregoing objects for a variety of reasons. In many cases the construction is complex, making it expensive to manufacture and inconvenient to clean periodically. This is of particular concern when the dispenser is used for food products that may spoil or affect the accuracy of measurement if retained in corners, crevices or recesses in the dispenser. Also, many dispensers require several manual operations, or require use of both hands, which may be an inconvenience. For example, it may be desired to measure out a quantity of a cooking ingredient while one hand is holding a food vessel, a food or a food ingredient, or while one hand is coated or wetted with a food ingredient.

This invention provides a dispenser of simplified form, readily and inexpensively manufactured of molded parts. The structure may be easily disassembled for cleaning. The basic parts comprise a hopper, a receptacle preferably in the form of a drawer slidable from a receiving position under the hopper, and an elongate barrel member rotatable in alternate directions for first receiving predetermined measured discrete quantities of the material from the hopper and then transferring these quantities to the receptacle.

BRIEF DESCRIPTION OF THE DRAWING

FIG. 1 is a front elevation of a preferred embodiment.
FIG. 2 is a view in plan of the embodiment of FIG. 1.
FIG. 3 is a partial elevation in section taken on line 3—3 of FIG. 2.
FIG. 4 is a longitudinal view in section taken on line 4—4 of FIG. 3.

DETAILED DESCRIPTION

The illustrated preferred embodiment comprises a measuring dispenser generally designated 12, the major parts of which are preferably molded of plastic. A housing 14 has outer side walls each comprising upper and lower flat sloping portions 16 and 18, respectively. A flat front wall 42 and a flat back wall 44 parallel therewith extend between the side walls. The top rims of the front and back walls have grooves 20 for receiving mating inwardly projecting ridges on a pair of sliding covers 22 and 24. These covers are shaped to meet over the center of the housing for completely closing its upper end. Recesses 26 and 28 are formed in the covers to assist in sliding them open or closed. The lower edges of the wall portions 18 and of the front and back walls form a rim to rest the housing on a table or counter.

Mirror image shaped partitions 30 and 32 are molded integrally with the housing 14 and project inwardly from its side walls and from the front wall to the back wall to define the bottom wall of a hopper 34 having an elongate rectangular shaped aperture 36. The partitions are preferably sloped as shown in FIG. 1 to assist the flow of material toward the aperture.

The partitions 30 and 32 extend beneath the aperture in the form of segments 38 and 40 of a cylinder extending between the front and back walls 42 and 44. At their lower ends the segments define an elongate rectangular shaped slot 46 also extending between the front and back walls.

A drawer 48 having a handle 50 is inserted slidably into an opening in the front wall 42 of the housing, and may be closed to a position underlying the slot 46 throughout its length, or removed from the housing for pouring its contents into another vessel.

An elongate barrel member designated generally at 52 comprises a plurality of molded plastic parts. These include four measuring portions 54, 56, 58 and 60, each of cylindrical peripheral shape and of a predetermined axial length, and also a handle 62. Preferably, the handle has an arrow mark 64 for pointing at selected legends printed on the front wall of the housing, as shown in FIG. 1.

The measuring portions 54, 56, 58 and 60 have recesses 66, 68, 70 and 72, respectively each of which, as formed, has three sides, one end wall and an open peripheral end. When the barrel member parts are assembled together as shown, each recess has a predetermined volumetric capacity. In the form shown, the recess 72 has a capacity of one-fourth cup; the recess 70 has a capacity which, when added to that of the recess 72, provides a total of one-third cup; the recess 68 has a capacity which, when added to those of the recesses 70 and 72, provides a total equal to one-half cup; and the recess 66 has a capacity which, when added to those of the recesses 68, 70 and 72, provides a total equal to one full cup.

Each part of the barrel member except the portion 54 has a projection that fits into and forms a wall of the recess in an adjacent part. In the preferred embodiment the projections therefore have the same shapes as the recesses when viewed as in FIG. 3. Thus a projection 74 on the handle 62 fits into the recess 72, forming a wall thereof. Similarly, projections 76, 78 and 80 are respectively fitted into the recesses 70, 68 and 66, respectively, to form walls thereof.

In addition to forming walls of the respective recesses, the projections form a keying function, retaining the recesses in a predetermined mutual angular relationship. Two parallel walls of each recess lie in planes parallel to the axis of the barrel member. The dimensions of these walls of the recess 72, as viewed in FIG. 3, extend parallel to the direction indicated by the arrow 64. The dimensions of these walls of the recess 70 extend in a 45-degree counterclockwise displaced relation to the direction of the arrow. The dimensions of these walls of the recess 68 extend in a 90-degree counterclockwise displaced relation to the direction of the arrow. The dimensions of these walls of the recess 66 extend in a 135-degree counterclockwise displaced relation to the direction of the arrow.

A groove 82 is preferably formed at one end of the measuring portion 54, and a retention piece 84 is suitably fastened in the back wall 44 in position to enter the groove while permitting free rotational movement of the barrel member. The other measuring portions and the handle are retained by cementing the projections in the respective recesses or by providing a similar groove and bracket device (not shown), or the equivalent, for rotatably retaining the handle 62 on the front wall 42 of the housing.

In operation, the handle 62 is first rotated to bring the pointer 64 to the "store" position. If it is desired to measure and dispense one-fourth cup of material the pointer is rotated clockwise 90 degrees as viewed in FIGS. 1 and 3 to the "¼" position, thereby bringing the open end of the recess 72 into alignment with the aperture 36 in the hopper, this aperture also comprising the upper slot in the sleeve member formed by the segments 38 and 40. Then, the handle is rotated counterclockwise one-half turn, bringing the pointer 64 to a position centered on the slot 46. In this position the recess 72 is emptied into the drawer 48.

If it is desired to measure and dispense one-third cup, starting from the "store" position, the pointer 64 is rotated clockwise 135 degrees to the "⅓" position, thereby causing the recesses 72 and 70 to be successively filled in that order. Then, the handle is rotated counterclockwise until the pointer 64 is again centered on the slot 46, thereby dispensing the contents of both of the recesses 72 and 70, successively.

In a similar manner, one-half cup can be measured and dispensed by rotating the pointer 64 clockwise from the "store" position to the "½" position, and thereafter rotating the pointer counterclockwise until it is centered on the slot 46. In this case, the recesses 68, 70 and 72 are all successively filled and emptied. In like manner, one full cup can be measured and dispensed, in which case all four of the recesses are successively filled and emptied.

It will be apparent that variations in the described structure can be incorporated without departing from the spirit or scope of this invention. For example, the number, sizes and angular displacements of the recesses can be varied according to any selected system of measurement and the number of discrete volumes to be dispensed. Also, the barrel member and the recesses may be formed as one integral body or in any other desired manner. Other equivalent means may be provided for retaining the desired mutual angular relationship of the recesses when they are formed as separate parts.

I claim:

1. A measuring dispenser for flowable material having the combination of
   a hopper having an elongate aperture in the bottom thereof,
   an elongate sleeve member joined with the hopper and having a pair of longitudinally extending slots in the wall thereof, one of said slots communicating with said aperture and the other slot being located substantially diametrically opposite thereto,
   a receptacle alignable with said other slot,
   an elongate barrel member rotatable in the sleeve member and comprising a plurality of measuring portions mutally longitudinally displaced along the barrel axis, each portion comprising a single closed-ended recess of predetermined volumetric capacity, the recesses each having an open end in a wall of the barrel member alignable with each of said slots by rotation of the barrel member, said open ends being mutually angularly displaced about the axis of the barrel member and the volumes of the recesses being such that, by rotation of the barrel member in a filling direction from an initial angular position through less than 360 degrees to a limit angular position, the recesses are aligned sequentially with said aperture in the hopper until all of the recesses are filled, and
   means rotatable with the barrel member for indicating said initial and limit positions and at least one intermediate angular position, wherein a plurality less than all of said recesses are filled by rotation of said barrel member to said intermediate angular position in said filling direction, whereby upon reverse rotation of the barrel member the filled recesses are successively aligned with said other slot and emptied into said receptacle.

2. The combination of claim 1, in which the barrel member is of cylindrical shape.

3. The combination of claim 2, in which the recesses are rectangular in cross section and have equal widths transverse to the axis of the barrel member and differing lengths parallel to said axis.

4. The combination of claim 2, in which the measuring portions comprise separable cylindrical members.

5. The combination of claim 4, in which the measuring portions have means for mutually keying them in predetermined angular relationships.

6. The combination of claim 1, in which the measuring portions comprise separable members.

7. The combination of claim 6, in which the measuring portions have means for mutually keying them in predetermined angular relationships.

8. The combination of claim 7, in which a first measuring portion has a recess and a second measuring portion has an end projection inserted in the recess, the end projection and recess being shaped to retain the first and second measuring portions in a predetermined angular relationship.

9. The combination of claim 1, in which the hopper and sleeve are formed integrally, the sleeve comprising a pair of segmental cylindrical portions mutually spaced to define the slots.

* * * * *